April 7, 1942. M. S. JOHNSON 2,278,785
BRAKE HANGER BRACKET AND RETAINER MEANS
Filed Aug. 16, 1939
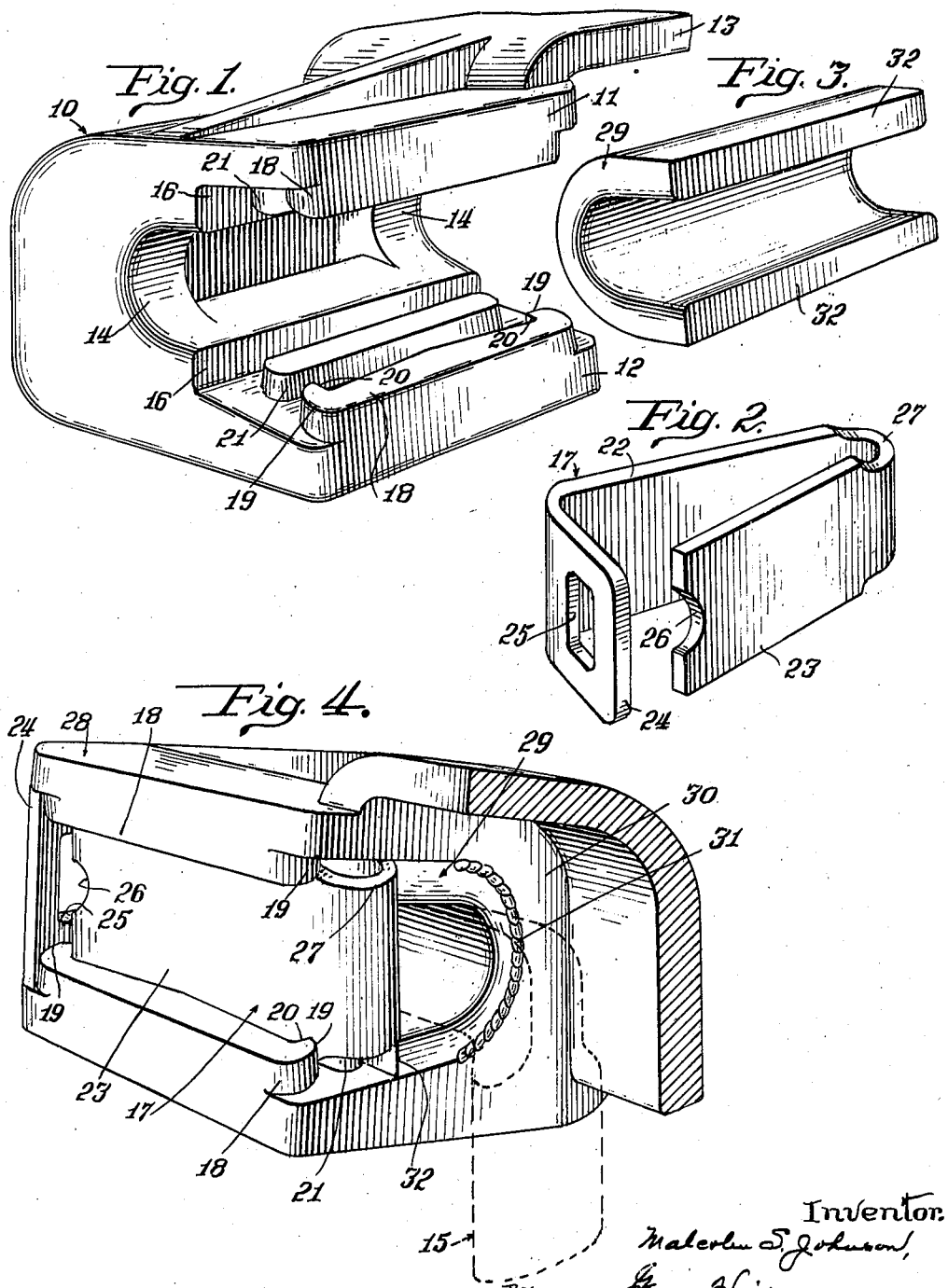

Patented Apr. 7, 1942

2,278,785

UNITED STATES PATENT OFFICE 2,278,785

BRAKE HANGER BRACKET AND RETAINER MEANS

Malcolm S. Johnson, Chicago, Ill., assignor to Illinois Railway Equipment Company, Chicago, Ill., a corporation of Illinois Application August 16, 1939, Serial No. 290,511

2 Claims. (Cl. 188—209)

My invention relates to the brackets whereby the brake hangers of railroad cars are pendently supported and to means whereby the hangers are removably secured in the brackets which are generally formed integral with the truck side frames.

More specifically stated, the invention involves a bracket open at the forward side and the two ends in conjunction with a retainer element adapted to be inserted in the bracket, after the brake hanger has been placed in the bracket, and to effect interlocking engagement with surfaces forming an integral part of the inner walls of the bracket; the hanger holding portion of the bracket preferably being provided with a wear resisting surface.

My invention has for its object the provision of a construction which will eliminate the use of the usual bolts or pins heretofore employed for fastening the hanger holding elements as well as the hanger in place.

The invention also has for its object the provision of a structure which involves a hanger retainer which may be easily inserted in the socket of the bracket, which automatically effects locking engagement with the bracket and which may be more readily removed when occasion requires than is the case with the usual bolt and nut method heretofore employed due to the bolts and nuts becoming rusted which in many instances necessitated burning off the bolts.

The aforementioned objects and advantages, as well as other advantages inherent in the invention, will all be readily comprehended from the detailed description of the accompanying drawing wherein—

Figure 1 is a perspective view of the outer or socketed end of my improved railroad brake hanger bracket.

Figure 2 is a perspective view of the retainer element employed with my improved bracket.

Figure 3 is a perspective view of a hanger receiving wear element which may be employed with the bracket.

Figure 4 is a perspective view of the outer end of the bracket (the inner end being broken away) showing a modification, provided with the wear element and the retainer element inserted therein, with the upper end of a hanger shown in dotted lines.

In the particular exemplification of the invention in Figure 1, a bracket 10 having vertically spaced jaws 11 and 12 is shown open at the forward side and at the ends to receive the usual brake hanger or link whereby the ends of the brake beam and attached brake-heads and shoes are pendently supported in place; the bracket being generally formed integral with the truck side frame through the medium of the integral arm of which a portion is shown at 13.

In structures as heretofore generally employed, the brake hangers were held in the open sided bracket by pins or bolts passing vertically through holes formed in the outer ends of the jaws 11 and 12; the bolts in turn having nuts screwed onto their lower threaded ends. Aside from the fact that the hangers were permitted to excessively vibrate—causing chatter and undue wear—this method of fastening the hangers in place was also found objectionable because of the difficulty encountered, when removal, or replacement of the hangers became necessary, due to the fact that the nuts on the lower threaded ends of the bolts became rusted and required the bolts to be burned off when a worn hanger was to be replaced. Then too, considerable annoyance and difficulty was encountered by the nuts unscrewing from the bolts as a result of the undesirable excessive vibration, which in turn permitted the bolts to gradually move upwardly out of their holes and producing the hazard of a dropping brake beam and brake-head resulting from the hanger creeping or jolting out of the bracket.

My invention contemplates the provision of a hanger receiving bracket whose jaws 11 and 12 are united at their inner ends by an arcuate wall 14 to constitute a portion of a hanger receiving channel; the upper end of a link hanger being shown in dotted lines at 15 in Figure 4. This channel forming portion of the bracket is shown provided with a thickened wall which terminates at the forward side of the channel to produce shoulders 16 extending transversely of the bracket and form abutments for a retainer element 17 shown in detail in Figure 2. The forward outer ends of the jaws 11 and 12 are provided with integral lugs 18, of similar configuration and provided with inturned ends 19 substantially at right angles to the main portions to provide the abutments or shoulders 20. Both jaws 11 and 12, intermediate of the shoulders 16 and the lugs 18, are also provided with lugs 21 disposed transversely of the bracket and suitably spaced from the shoulders 16 and the lugs 18 for the purpose hereinafter mentioned.

The retainer element 17 is preferably made of spring steel bent into loop form or somewhat U-shape and with the free end of the leg or side 22 bent toward the other leg or side 23 to provide the lobe 24 which is provided with a tool receiving opening 25; while the end of leg or side 23 is shown provided with a cut-out or notch 26 intermediate of its top and bottom edges for a purpose hereinafter described.

The jaws 11 and 12 of the bracket, shown in Figure 1, as previously stated, at a predetermined distance forward of the arcuate side walls 14 are reduced in thickness to provide the abutments or shoulders 16; the shoulders 16 being a sufficient distance forward of the arcuate side walls 14 to receive the brake hanger on the thickened wall portion of the jaws; and the shoulders 16 are a sufficient distance rearward of the lugs 21 to permit the side or leg 22 of the retainer element 17 to be forced endwisely therebetween, while the side or leg 23 of the retainer element is intended to enter between the lugs 21 and the lugs 18.

The arcuate or closed end of the retainer element 17 is reduced in vertical dimensions as shown at 27 in Figure 2 to enable the retainer element to pass over the lugs 21 during insertion; the reduction in vertical dimensions also permitting the retainer element to be more easily flexed.

With the lugs 18 and 21 of similar construction at their ends it is apparent that the retainer element 17 may be inserted from either side or end of the bracket 10.

After the brake hanger has been placed between the jaws of the bracket adjacent the arcuate walls 14, the arcuate or closed end 27 of the retainer element 17 is then endwisely inserted through one end of the bracket with the leg or side 22 of the retainer element disposed between the shoulders 16 and lugs 21 and substantially in abutting relation therewith to prevent forward flexing or movement of leg 22; while the other leg or side 23 of the retainer element enters between lugs 21 and 18; the free end of wall 23 of the retainer flexing toward side or leg 22 until it has passed the inturned ends 19 of lugs 18 at the end of the bracket through which the retainer element is being inserted. The retainer element 17 is driven lengthwise of the bracket until the bent end 24 contacts the adjacent ends 19 of the lugs 18 and as the normal spread between the free ends of the retainer element is greater than the distance between the lugs 21 and the inturned ends 19 of lugs 18, the side or leg 23 will spring back to normal condition, after its free end has cleared the inturned ends 19 at the end of the bracket through which the retainer is inserted and cause the end of leg 23 to automatically effect locking engagement with the abutments or shoulders 20 of lug 18.

With the end of leg or side 23 of the retainer element in abutting relation with the shoulders 20 of the lugs 18 of the bracket and the bent end 24 of the retainer element lapping the outer sides of the bent ends 19 of lugs 18, it is apparent that endwise movement of the retainer element in either direction is impossible and that all hanger thrusts encountered by the side or leg 22 of the retainer element will be transmitted through it to the lugs of the bracket.

In the event it becomes necessary to replace the hanger link 15, this may be accomplished by inserting a suitable tool or bar through the opening 25 in the bent end or lobe 24 at an angle so the end of the bar may pass through the cut-out or notch 26 in the other leg or side 23 of the retainer element and then tilting the bar or tool and using the outer side wall of opening 25 as a fulcrum until the free end of leg or side 23 of the retainer element is flexed inwardly sufficiently to clear the adjacent ends 19 of the lugs 18 on both jaws 11 and 12 of the bracket. With the ends of the retainer element flexed toward each other as mentioned the retainer element may then be driven or forced out of the bracket by hammer-blows on the arcuate closed end 27 of the retainer element.

As the brackets 10 are of cast metal, being cast integral with the truck side frames and are subject to wear as a result of the vibratory or swinging movements of the hanger, I have shown the bracket 10 in Figure 1 with a somewhat thicker wall at the inner ends of the jaws 11, 12, namely adjacent the arcuate wall 14.

In Figure 4 I illustrate a modification in so far as the hanger receiving portion of the bracket 28 is concerned, namely by providing a hardened wear receiving surface in the nature of a substantially semi-cylindrical member 29, shown in detail in Figure 3. The member 29 is of length sufficient to permit it to extend from end to end of the bracket, with its closed arcuate side resting against the arcuate end walls 30 of the bracket and the ends of the member 29 preferably welded to the bracket as shown at 31 to prevent shifting of the member. With the welding at the exposed ends of the member it is possible to replace and renew the member if occasion should require. Of course, the member 29 could be cast into and made a part of the bracket but it would then not be replaceable. Where member 29 is employed the forward longitudinal edges 32 provide abutments adapted to engage the leg or side 22 of the retainer element or key 17 and the bracket need not be provided with the shoulders 16. After the member 29 has been put into place as described and the hanger 15 inserted therein, the retainer key or element 17 is then endwisely driven through one end of the bracket in the manner heretofore described; the retainer key or element 17 constituting one side or wall of the hanger socket and any pressure or force exerted thereon by the hanger will tend to increase or maintain the interlocking engagement between the retainer key or element and the lugs of the bracket.

My invention provides a structure wherein the brake hanger or link is held in the socket of the bracket by a retainer key or element which automatically effects locking engagement with the bracket whereby movement of the retainer endwisely or transversely of the bracket is impossible and hence its accidental displacement, as a result of the pressure or force exerted thereon by the hanger, is impossible.

The exemplifications, which are believed to be the simplest embodiments of the invention, have been described in terms employed for purposes of description and not as terms of limitation, as structural modifications may be made without, however, departing from the spirit of the invention as defined in the appended claims.

What I claim is:

1. A brake hanger bracket and retainer means comprising a bracket provided with vertically spaced apart jaws; a removable hanger receiving channel member disposed transversely of the bracket at the inner ends of said jaws and adapted to provide shoulders in the bracket forward of the channel, the jaws forward of the shoulders being provided with laterally spaced off-set surfaces; and a U-shaped retainer element adapted to be edgewisely inserted in the bracket between said shoulders and the adjacent off-set surfaces and between the spaced apart off-set surfaces and normally effecting interengaging relation with certain of said off-set surfaces.

2. A brake hanger bracket and retainer means comprising a bracket formed with vertically spaced jaws open toward the forward side of the bracket and at opposite ends, the opposing faces of the jaws adjacent their forward ends being provided with opposing lugs; a wear member inserted in the bracket at the inner ends of the jaws and extending transversely of the bracket to provide a hanger receiving channel and to provide shoulders forward of the hanger receiving channel, said wear member terminating a distance rearward of said lugs of the bracket; and a resilient retainer element adapted to be endwisely inserted through an open end of the bracket between said shoulders and said lugs and adapted to automatically effect interengaging relation with certain of said lugs.

MALCOLM S. JOHNSON.